United States Patent

[11] 3,620,577

| [72] | Inventors | James C. Neisch<br>Orchard Lake;<br>Alton B. Holmes, Troy, both of Mich. |
|---|---|---|
| [21] | Appl. No. | 883,407 |
| [22] | Filed | Dec. 9, 1969 |
| [45] | Patented | Nov. 16, 1971 |
| [73] | Assignee | North American Rockwell Corporation<br>Pittsburgh, Pa. |

[54] BRAKE CONTROL SYSTEM
5 Claims, 3 Drawing Figs.

[52] U.S. Cl. .................................................. 303/21 EB,
188/181 C, 303/7, 303/20
[51] Int. Cl. .................................................. B60t 8/08,
B60t 8/10
[50] Field of Search ......................................... 188/181;
303/21 A, 21 BB, 21 BE, 21 EB, 21 P, 6, 7, 20

[56] References Cited
UNITED STATES PATENTS

| 3,260,555 | 7/1966 | Packer | 303/21 EB |
| 3,394,967 | 7/1968 | Lucien | 303/21 P |
| 3,398,995 | 8/1968 | Martin | 303/21 BE |
| 3,467,443 | 9/1969 | Okamoto et al | 303/21 BE |
| 3,479,094 | 11/1969 | Chovings | 303/21 A |
| 3,499,689 | 3/1970 | Carp et al. | 303/21 P |
| 3,503,654 | 3/1970 | Stamm | 303/21 EB |

*Primary Examiner*—Milton Buchler
*Assistant Examiner*—Stephen G. Kunin
*Attorneys*—John R. Bronaugh, Floyd S. Levison, E. Dennis O'Connor and Richard A. Speer ABSTRACT: An electronic antiskid vehicle brake control system in which a pulse signal indicating the speed of one or more rear vehicle wheels is constantly compared to a reference pulse signal indicating the speed of the front vehicle wheels and a control signal is generated upon detection of a predetermined velocity differential. The control signal modulates the braking effort at the rear wheels. The front wheel brakes are released if they lock during brake application to permit the front wheels to regain speed to reestablish the reference signal and preserve steerability of the vehicle. When applied to a tractor-trailer combination the control system is automatically made compatible with a variety of trailer brake configurations.

INVENTORS
JAMES C. NEISCH
ALTON B. HOLMES

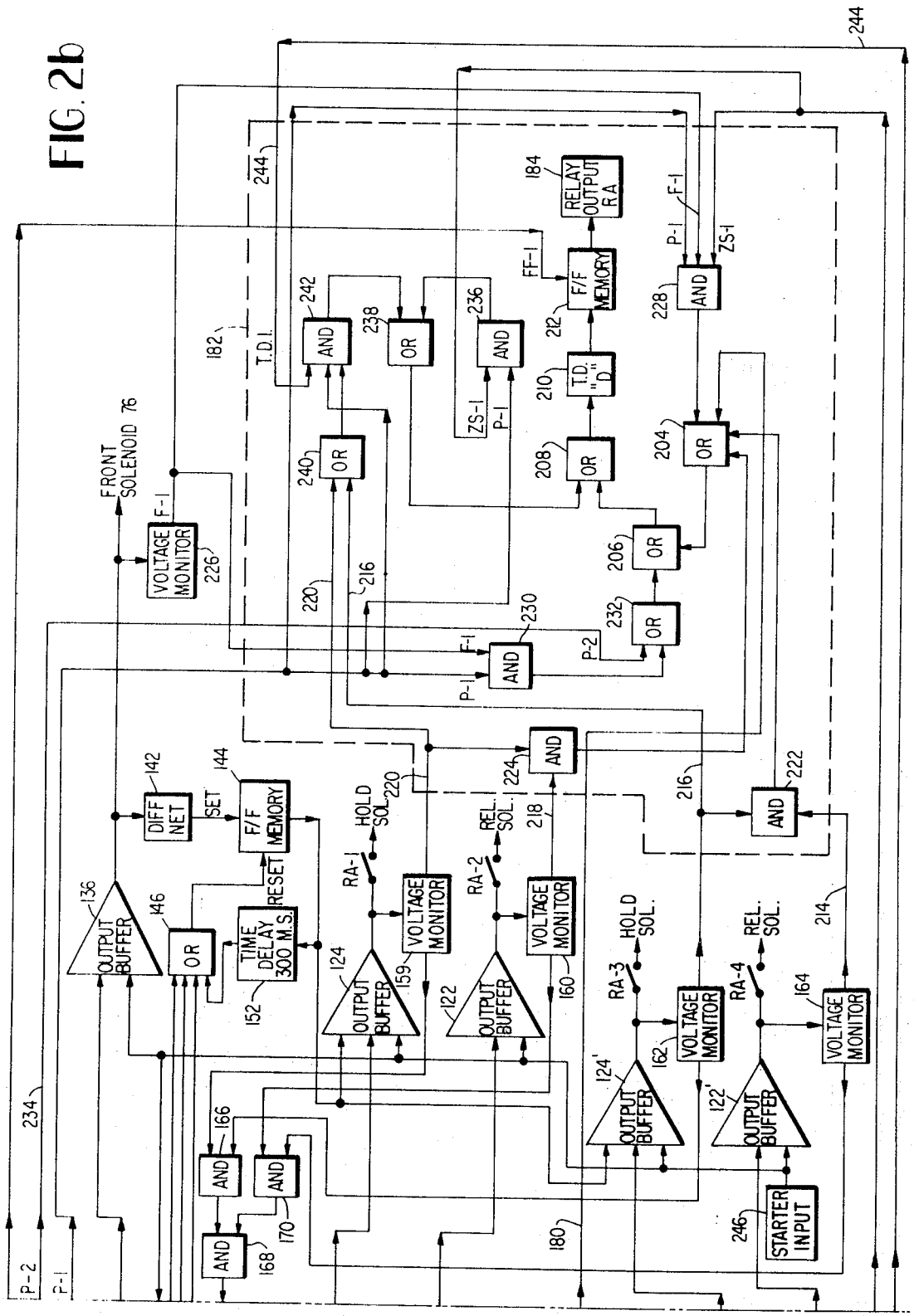

BRAKE CONTROL SYSTEM

RELATED APPLICATIONS

Related brake control systems are disclosed in copending application Ser. No. 709,706 filed March 1, 1968 now abandoned in view of continuation application Ser. No. 37,396 filed May 11, 1970, for Electronic Antiskid Brake Control System and owned by applicant's assignee and application Ser. No. 883,408 filed Dec. 9, 1969 and also owned by applicant's assignee.

BACKGROUND OF THE INVENTION

In recent years many so called antiskid brake control systems have been developed to provide automatic modulation of the braking effort at certain or all of the vehicle wheels to prevent wheel lockup and skid with consequent loss of vehicle directional control.

One of the most effective of these systems is described in the aforementioned copending application Ser. No. 709,706 now abandoned in view of continuation application Ser. No. 37,396 filed May 11, 1970. That system includes means for generating signals which are, respectively, indicative of the speed of the front and rear vehicle wheels. When these wheels are rotating at essentially the same speed the control system is inactive and the brakes are operated in the normal manner. If the speed of the rear wheels falls below the speed of the front wheels by a first predetermined amount a "hold" control signal is generated which effectively prevents the application of further braking effort to each of the rear wheels. This action will be maintained as long as the underspeed condition of the rear wheels exists. If the speed of the rear wheels relative to the speed of the front wheels continues to fall a "release" control signal is generated which reduces the braking effort applied to the rear wheels. Again the signal is maintained so long as the underspeed condition of the rear wheels persists. Fundamental to the operation of this prior system is the use of the signal generated by the rotation of the front wheels as a reference signal with which the signal indicative of the speed of the rear wheels is compared. Failure or absence of the reference signal, which occurs, for example, when the front wheels lock, renders the action of the control indeterminate. In recognition of this factor the prior system included means for rendering the entire control system inactive when the speed of the front wheels became less than that equivalent to a vehicle speed of 5 miles per hour. This arrangement however, would permit sudden unintended full application of the brakes possibly resulting in a violent skid.

While the function of the prior control system was excellent under most conditions its application was limited because of economic factors primarily because of the employment of complex electronic circuits and costly mechanical components.

SUMMARY OF THE INVENTION

It is the principal purpose and object of the present invention to provide improved electronic antiskid brake control systems which function reliably, predictably, and safely under a wider variety of operating conditions than prior systems and which may be manufactured, sold and serviced at substantially reduced cost.

In attaining these and other objects the present invention provides an improved brake control system of the general type disclosed in the aforesaid copending application Ser. No. 709,706, now abandoned in view of continuation application Ser. No. 37,396 filed May 11, 1970.

As in the prior system a signal indicative of the speed of one or more front wheels is employed as a reference with which a signal indicative of the speed of the rear wheels is compared. A control signal effective to establish a "hold mode" at the rear wheel brakes is generated whenever a minor underspeed condition is detected during braking. A second control signal effective to establish a "release mode" at the rear wheel brakes is generated when a greater rear wheel underspeed condition is detected.

In accordance with the present invention a third control signal is generated when the front wheels lock during braking, the signal being effective to fully release the front wheel brakes. The front wheel brakes remain released until the braking cycle is completed. Experience has shown that, even when the vehicle is operated on a surface having an extremely low coefficient of friction, the front wheels resume normal rolling speed very rapidly after the front wheel brakes are released. The resumption of front wheel speed restores the reference signal which permits subsequent operation of the control system in accordance with its intended program and at the same time restores the steerability of the vehicle.

The third control signal has a second important related function, i.e. it places all of the rear brakes in "hole mode" regardless of their condition when the front wheels became locked. This system has important operational advantages over prior systems. For example, during a panic stop in the course of which the rear wheels reach a severe underspeed condition and the front wheels lock, the loss of the signal from the front wheels merely stabilizes the brake force applied at the rear wheels. In the prior system, loss of the reference signal from the front wheels upon front wheel lock resulted in the possible sudden application of full braking pressure to the rear wheels with adverse and possibly disastrous results.

In an other important aspect, the invention provides a significant simplification of prior systems. More specifically the wheel speed comparison, which is basic to the operation of the control system, is effected by comparing a single signal from the front wheels and a single signal derived from the rear wheels to be controlled. Experience has demonstrated that the single signal from the rear wheels should indicate the speed of all rear wheels. In a tractor-trailer combination it is thus often necessary to produce a single signal indicating the speed of four rear wheels. It was previously thought necessary to employ a conventional, but expensive, electronic network to sum the four inputs to provide this required single output signal. It has now been discovered, however, that by differentiating the pulses comprising the signal from the individual rear wheels to produce pulses of very short duration, these signals may be passed through a simple OR gate to provide a single output signal including all of the input pulses thus effectively summing all the input pulses.

The present invention also provides an important simplification in the mechanical components of the system which materially reduces the cost and weight of the system and yet improves its important performance characteristics. More specifically as was formerly thought necessary to locate the hold and release valves in the main air lines leading to the rear brakes. Because of the relatively large volume of air flowing through these lines it was necessary to utilize large valves having ports of sufficient size to accommodate the flow without substantial throttling.

In accordance with the present invention the hold and release valves are positioned in the control lines between the operator controlled treadle valve and the relay valve conventionally provided in a tractor or the relay-emergency valve conventionally provided in a trailer. The volume of air passing through these control lines is relatively small. Accordingly, the valves may be of substantially reduced size and cost. Typically, the saving may be as much as two-thirds the cost of the larger valves. Elimination of valves in the main brake lines and the utilization of smaller valves in the relay control lines also substantially improves the response time of the entire brake system.

As indicated above the present invention has particular utility in connection with tractor-trailer combinations. The tractors may run without a trailer attached or may be associated with a trailer having two rear wheels or four rear wheels. The present invention provides means for automatically rendering the portion of the control system carried by the tractor compatible with the portion of the control system carried by the trailer to obtain uniform control function under any of these configurations.

Additional objects and advantages of the present invention will become apparent as a detailed description proceeds.

DESCRIPTION OF PREFERRED EMBODIMENT

While the brake control system of the present invention may be applied to a wide variety of types of vehicles it will be disclosed herein as applied to a tractor-trailer combination an environment in which it has particular utility.

Figure 1:
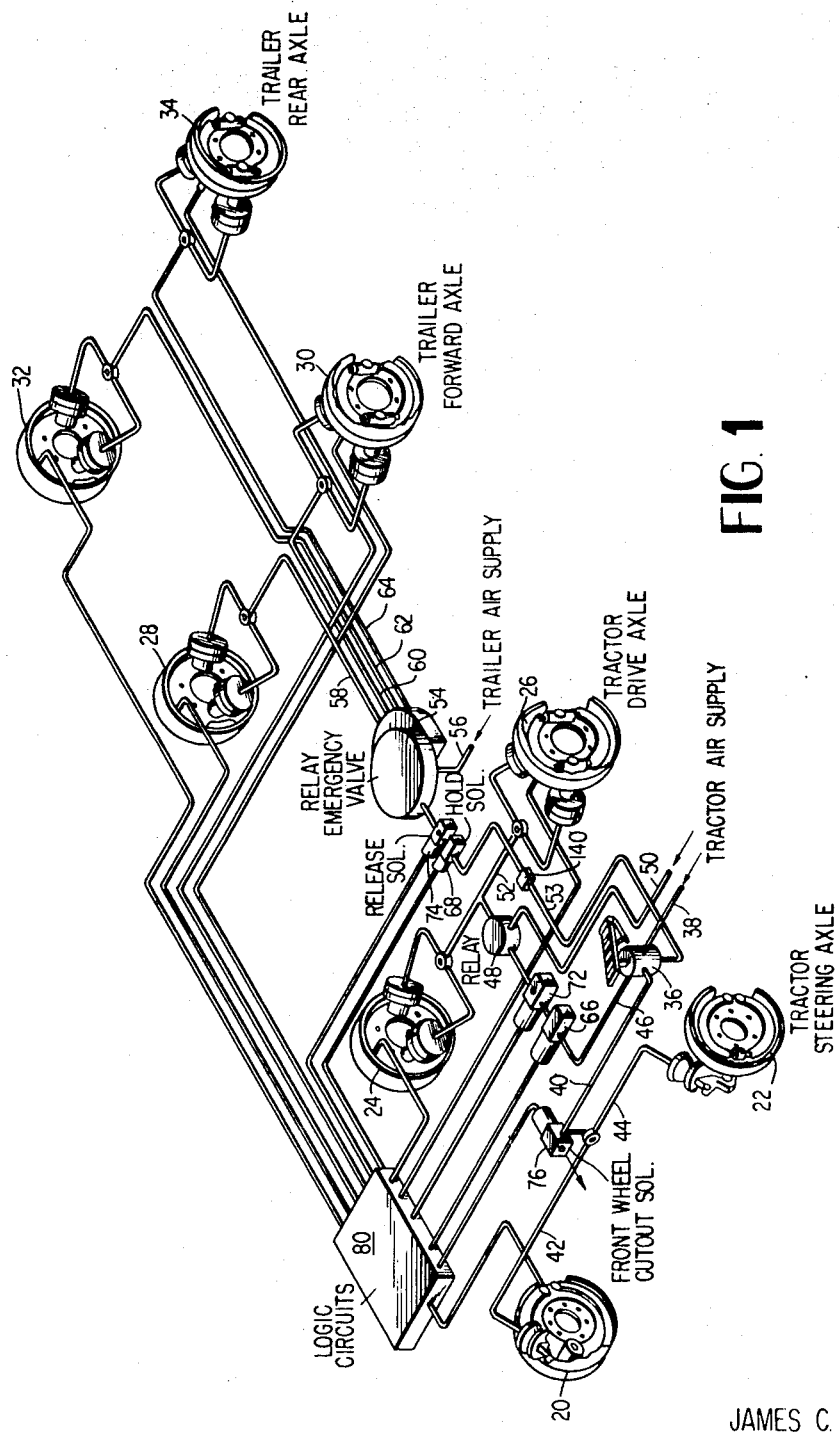
FIG. 1 illustrates diagrammatically a typical tractor-trailer brake system incorporating the control system of the present invention.

FIG. 1 is a schematic illustration of a typical brake control installation in which the vehicle is equipped with an airbrake system for operating the brakes 20 and 22 associated with the front tractor wheels, brakes 24 and 26 associated with the rear tractor driving wheels, brakes 28 and 30 associated with the front trailer axle and brakes 32 and 34 associated with the rear trailer axle.

The brakes are controlled by the usual treadle valve 36 which connects a source of air under pressure, not shown, supplied through line 38 to the tractor front wheel brakes through line 40 and connected conduits 42 and 44, and supplies air under pressure through conduit 46 which operates a relay valve 48 to connect a second main pressure line 50 to the rear brakes through conduit 52 and appropriate branch conduits.

The operator controlled valve 36 also selectively connects the pressure line 38 to a line 53 leading to a relay-emergency valve 54 which connects a trailer air supply line 56 to the conduits 58 and 60 leading to the brakes on the front trailer axle and conduits 62 and 64 connected to actuate the brakes associated with the rear trailer axle. The brake system thus far described is entirely conventional and under normal conditions the brake system operates conventionally.

As explained in detail below, the control function is exercised through operation of valves interposed in the air conduits which are effective, when a minor tendency of the wheels to lock is detected, to prevent the application of further brake pressure to the affected wheels, or when a major tendency of the wheels to lock is detected, to release the actuating pressure supplied to the affected wheels. More specifically, a solenoid operated "hold" valve 66 is interposed in the control line 46 leading from the valve 36 to the relay valve 48 which controls the rear tractor brakes and is effective, when actuated, to prevent the application of further pressure to these brakes. A similar solenoid-operated "hold" valve 68 is interposed in the control line 53 connecting the valve 36 and the relay-emergency valve 54 to prevent the application of further pressures to the brakes associated with the trailer wheels. "Release" valves 72 and 74, respectively, are positioned in series with the respective valves 66 and 68 to release the rear tractor brakes and the trailer brakes. The location of the valves 66, 68, 72 and 74 in the relay control lines permits the use of valves of substantially reduced size, weight and cost. Those valves in this location eliminate interference with normal brake application and substantially reduce the response time of the control system. A similar solenoid actuated valve 76 is interposed in the conduit 40 and is effective when actuated to release the front tractor brakes. It will be understood that the valves 66, 68, 72, 74 and 76 are normally deenergized, and, when deenergized, have no effect on the braking system which operates in a conventional manner.

The several control valves are operated by an electronic network indicated generally at 80. Essentially the network 80 compares the speed of one of the front wheels 20 or 22 with the average speed of the rear tractor wheels and with the average speed of trailer wheels to generate a "hold" signal when the speed of the rear tractor wheels or trailer wheels falls to a predetermined percent of the speed of the front wheel and to generate a second or "release" signal when the speed of the rear tractor wheels or the trailer wheels reaches a smaller percent of the speed of the front wheel. In a typical case the "hold" signal is generated when the speed of the rear wheels falls to approximately 75 percent of the speed of the front wheels and the "release" signal is generated when the speed of the rear wheels falls to approximately 25 percent of the speed of the front wheels. The control system is also effective to release the front wheel brakes entirely in the event the front wheels become locked for the dual purpose of retaining vehicle steerability and permitting the front wheels to provide a reference signal for the effective control of the brakes at the other wheels.

Also of particular importance is the capability of the system to deenergize itself in the event of any significant failure. As explained in detail below all principal components of the system are continuously monitored and, in the event of failure detection, the control functions applicable to the rear wheel brakes are discontinued to permit normal operation of the brakes under operator control.

Figure 2A:
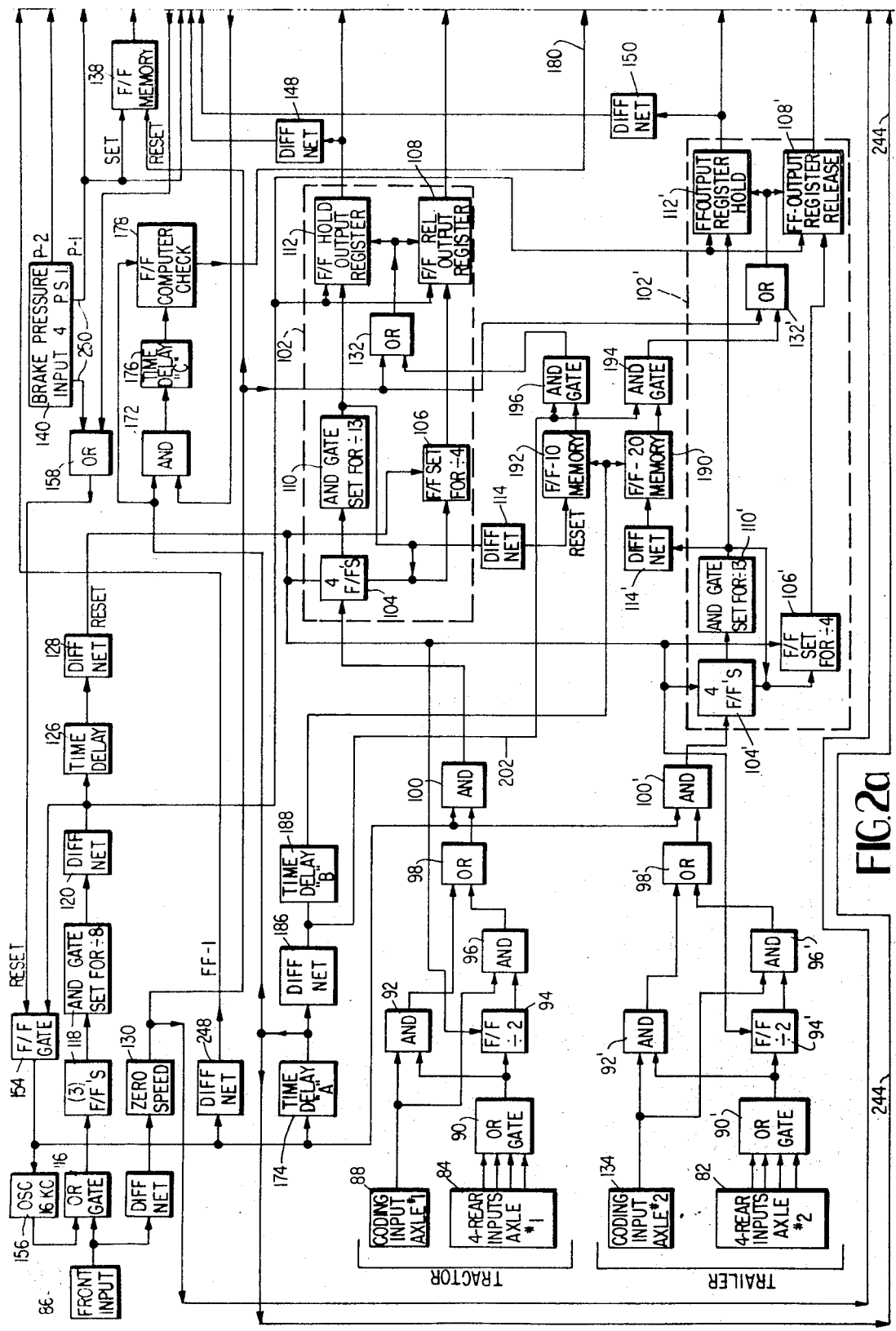
FIG. 2 (appearing as FIG. 2A and 2B) is a block diagram of the electronic components of the brake control system.

The principal components of the electronic network 80 are shown in FIG. 2, to which detailed reference will now be made. The inputs to the system comprise signals, the frequencies of which are functions, respectively, of the sum of the rotational velocities of the rear tractor wheels, the sum of the rotational velocities of the trailer wheels, and the rotational velocity of a selected tractor front wheel. Preferably the signals are generated by transducers associated with the vehicle wheels as disclosed for example in copending application Ser. No. 709,706, now abandoned in view of continuation application Ser. No. 37,396 filed May 11, 1970. The signals from the trailer wheels are supplied to a signal conditioner 82, the signals from the rear tractor wheels is supplied to a signal conditioner 84, and the signal from the front tractor wheel is supplied to a signal conditioner 86.

As indicated above, the signal from the rear wheels to be controlled is constantly compared with the reference signal from the front wheel. This comparison can be accomplished only after the two of four velocity signals from the trailer wheels or the tractor rear wheels are converted to a single signal representative of the speed of the rear tractor wheels and a single signal representative of the speed of the trailer wheels. In prior systems an elaborate relatively expensive network was employed to effect this conversion.

The present invention eliminates this network and substitutes signal conditioner 82 and the OR gate 90' for providing the signal from tractor wheels and the signal conditioner 84 and OR-gate 90 for providing the signal from the rear tractor wheels.

The signal conditioners 82 and 84 convert the sinusoidal signals from the transducers to square wave signals which are differentiated into narrow spikes having a width in a typical case of 330 nsec. ($330 \times 10^{-9}$ sec.). The signals comprising a series of spiked pulses are directed to the OR-gates 90 or 90', the output of which is a signal having a frequency which is the effective sum of the frequencies of the signals originating at the individual wheels.

It has been discovered, contrary to prior belief, that even at high vehicle speeds the probability that input signals from the individual rear wheels will be delivered to the OR-gates 90 or 90' in phase thus destroying the accuracy of the output signal from these gates is sufficiently low so that the error in count, if it occurs, is well within acceptable limits.

The tractor and trailer each deliver two wheel velocity signals to the signal conditioner 82 or 84 for each rear axle. At the time of installation the tractor is coded depending on the single or dual rear axle configuration. The coding unit for the tractor is indicated at 88. If the tractor has four rear inputs the coding unit is effectively in the circuit. If the tractor has two rear inputs the coding unit is shorted. The output from OR-gates 90 is fed to an AND-gate 92 and to a frequency divider unit 94 which effectively divides the input by 2, the reduced frequency output of the unit 94 being transmitted to AND-gate 96. The output of AND-gates 92 or 96 is transmitted through OR-gate 98 to the AND-gate 100. The AND-gate 92 is conditioned to pass the signal from the OR-gate 90 if the coding unit 88 is shorted, thus passing to the gate 100 the full output of the gate 90 when there are two inputs to gate 90. The ANDigate 96 is conditioned by coding unit 88 to pass signals from gate 90 to OR-gate 98 only if the coding unit 88 is not shorted indicating the presence of 4 inputs to the gate 90. Thus gate 100 receives either the sum of two inputs from gate 92 or the sum of 4 inputs divided by two through the gate 96.

As explained below the output of AND-gate 100 is fed to a ratio comparator assembly 102 except when the comparator circuit is being checked. The comparator assembly includes a flip-flop counter 104 which has a capacity of completing a 16 count. When it reaches a count of 4 it transmits a pulse to the flip-flop 106 which immediately transmits a pulse to "release" output register 108. The counter 104 also produces an output pulse at the count of 13 which is transmitted through an AND-gate 110 to a "hold" output register 112. The output of the gate 110 is also fed back to the counter 104 to inhibit further action by the counter. The output of the gate 110 is also fed to a differentiating network 114 and the associated circuit described below. The input signals from the trailer are passed through an identical circuit, 90'-112'.

The output of the front input unit 86 is transmitted through OR-gate 116 to the frequency divider 118 and the differentiating network 120 to the output registers 108, 112, 108' and 112'. These registers are so arranged that they change state and transmit signals to the associated output buffers 122, 124, 112' and 124' only if the count from the front input is completed before the count from the rear input is completed. Accordingly, during normal operation the output of these registers remains low and the hold and release solenoids remain deenergized.

Upon completion of the count from the front input 86, a reset signal is delivered through a time delay 126 and a differential network 128 to reset the flip-flops 94 and 94' counters 104 and 104' and flip-flops 106 and 106' and the cycle is repeated. As described below the pulse from the network 120 derived from the front wheel input may initiate the comparator check.

If a count of 13 pulses from the rear wheel inputs has not been delivered to the "hold" registers 112 and 112' when a count of 8 pulses has been delivered from the front wheel input which indicates an incipient wheel lock at the rear wheels the registers change state, and buffer 124 or 124' is energized to actuate the hold valve 66 or 68 to prevent the application of further brake pressure to the appropriate rear wheels. Similarly if a 8 pulse count is delivered from the front wheel input before a 4 pulse count is delivered by the rear wheels the release registers 108 or 108' change state to energize the solenoid driver 122 or 122' to actuate the release valve 72 or 74 to release the brakes at the effected rear wheels.

As thus far described the basic function of the system is essentially the same as that disclosed in copending application Ser. No. 709,706, now abandoned in view of continuation application Ser. No. 37,396 filed May 11, 1970, that, the added circuitry employed in the latter to select the fastest front wheel and the slowest rear wheel for comparison have been eliminated. The system in the present case compares a signal which is a function of the speed of a selected front wheel with a signal which is a function of the instantaneous average speed of the rear wheels. To effectively disconnect the control circuit at low vehicle speeds a zero speed detector 130 is provided. This unit, which may be of the same type as the corresponding unit disclosed in application Ser. No. 709,706, now abandoned in view of continuation application Ser. No. 37,396 filed May 11, 1970, is calibrated to produce an output signal when the vehicle speed drops below 5 miles per hour. This output signal is transmitted to OR-gate 132 or 132' and hence to the registers 108, 108', 112 and 112' to maintain output low so long as the low-speed condition persists.

The computer and counting circuit just described is duplicated to provide the same control for the trailer brakes. The only components actually located in the trailer are the coding unit 134 and the magnetic transducers associated with the rear trailer wheels. The outputs of these units are carried to a common plug located in the forward portion of the trailer for plug-in attachment to a cord carrying the corresponding lines from the tractor unit. If the trailer is equipped with a single rear axle and thus produces two inputs, the plug in the trailer will be arranged to short out the coding unit 134. If the trailer has 4 inputs the short will be omitted thus rendering the coding unit active. Thus the computer system located in the tractor is automatically compatible with trailers having single or dual rear axles.

The control system is effective to release the front brakes if the front wheels lock during brake application. The front wheels remain released until the braking cycle is terminated. This permits the front wheels to roll up to running speed quickly to preserve the steerability of the vehicle and to assure the preservation of the proper front input signal which provides a reference for the control of the remaining brakes. The control solenoid 76 is operated by a buffer 136 which is actuated by the output of the memory unit 138. One input to the memory unit is a "brake off" signal from the brake pressure switch 140. The outer input is derived from the zero-speed detector 130. The memory unit 138 is so arranged so that the brake off signal predominates and effectively inhibits any output of the memory unit 138 so long as the brake off signal persists. When a brake on signal is present, the output of the memory unit 138 is a function of the presence or absence of the zero-speed signal. When the latter is present the buffer 136 is actuated to operate the front solenoid and release the brakes. The signal from the unit 138 persists until the brake off signal is restored thus the front brakes will remain released until the particular braking cycle is ended.

The high output of the buffer 136 is also fed through a differential network 142 to set a memory unit 144 which transmits an actuating signal to the hold buffers 124 and 124' to place all of the rear brakes in the hold mode. The hold signal produced by the memory unit 144 may be terminated in three ways. First, a brake off signal transmitted through OR-gate 146 transmits a reset signal to the memory unit 144 to inhibit its output. Second, if either hold solenoid is actuated by the comparators 102 and 102' a signal will be fed through the differentiating network 148 or 150 through the OR-gate 146 to reset the memory unit 144. Finally the memory unit 144 will be reset by a signal produced by the time delay network 152 fed through the OR-gate 146. The time delay is about 300 msec. which tests have shown is ordinarily sufficient to permit the front wheels to regain speed after the brakes have been released.

In the absence of the "hold" signal produced by the memory unit 144 upon front wheel lock it is possible to lose the hold and release signals permitting sudden full application of the rear brakes which produces an unstable vehicle condition.

The control system also includes a dual system for continuously monitoring the function of the significant signal generating and control components and an automatic failure detection system to deenergize the entire control system and restore normal braking upon failure detection. This system includes both a periodic dynamic check of the function of the ratio comparators and their inputs and a continuous static check which deenergizes the control system at any time upon the detection of predetermined failure conditions. Essentially the dynamic test is made by periodically generating a signal which simulates a condition requiring the energization of all hold and release valves. If, under these conditions, any of the valves are not energized the control system is disconnected and a failure indication lamp is lit. The dynamic check also includes a system for detecting the improper energization of either of the hold solenoids just prior to the initiation of the dynamic test.

With continued reference to FIG. 2 the comparator check is initiated by the pulse signal delivered by the frequency divider 118 at the completion of the count from the front wheel input in the absence of a signal through OR-gate 158 from a brake pressure switch 140 (FIG. 1) indicating the brakes are applied. If the brakes are applied the output of the gate 154 is inhibited and the computer check is similarly inhibited to avoid interference with the normal control function of the system. If the brakes are off the output of the gate 154 actuates a high-frequency oscillator (16kc.) 156 the output of which is fed through the OR-gate 116, the frequency divider 118 and the network 120 to the ratio comparators 120 and 102' and to the flip-flop 154 which is reset to discontinue operation of the oscillator 156. When the gate 154 is originally activated to energize the oscillator 156 the output of the gate is also delivered to the AND-gate 100 and 100' to inhibit the output of these gates and thus inhibit delivery of the rear input signals to the comparator 102 and 102'. Accordingly, the comparators sense a condition requiring the energization of all hold and release solenoids. If the units are functioning properly, voltage monitors 159, 160, 162 and 164 connected in parallel with the various solenoid drivers will produce appropriate output signals. If both voltage monitors 159 and 162 indicate operation of both hold solenoid drivers, AND-gate 166 will transmit a signal to AND-gate 168. Similarly, if the voltage monitors 160 and 164 indicate operation of the release solenoid drivers, AND-gate 170 will transmit a signal to the AND-gate 168 which in turn transmits a signal to AND-gate 172. The other input to AND-gate 172 is derived from the signal delivered by the gate 154 to stop the oscillator 156, this signal being fed through a time delay network 174. The AND-gate 172 will pass a signal to the time delay unit 176 only when a pulse is received from the unit 174 and one or more of the hold or release solenoids is off. If the system is operating properly and all solenoids have been energized, the time delay network 176 will remain deenergized and a set signal will not be delivered to the flip-flop 178. However, a reset signal will be delivered from the time delay network 174 for the purpose of eliminating any previous failure signals that might have existed in the flip-flop 178. If however, one or more of the solenoids are off during the test cycle, a set signal will be delivered to the flip-flop 178 resulting in the delivery of a corresponding signal through the line 180 to the static failsafe logic unit 182. As explained below, a positive signal from the line 180, which indicates a failure of the comparators 102 or 102', energizes a relay 184 which effectively disconnects the control system (except the front solenoid 76) from the brake system.

At the conclusion of the comparator check cycle, the output registers 108, 108', 112 and 112' must be reset to deenergize all of the solenoids. To this end a circuit comprising a differentiating network 186, a time delay unit 188, a pair of memory units 190 and 192 and a pair of AND-gates 194 and 196 is provided. The circuit operates as follows. If it is assumed that the system is operating properly and that the rear inputs are all in operation the rear wheel pulse count will be completed before the front wheel pulse count. The rear wheel signals will be generated and fed through differentiating networks 114 and 114' to reset the memory units 190 and 192, respectively, thus supplying one input to each of the AND-gates 194 and 196. The other input is delivered from the differentiating unit 186 through a line 202. The resulting output of the gates 194 and 196 will then reset the registers 108 and 108', 112 and 112' to deenergize all of the solenoids. The subsequent delivery of the set signals from time delay unit 188 will have no effect on this system. If, however, due to failure of one of the rear inputs or for other reasons, the reset signal has not been delivered to the memory unit 190 or 192, the output of the associated AND-gate 196 or 194 will be inhibited and the associated register units 108 and 112 or 108' and 112' will generate a "solenoid on" signal. These signals will energize one or more of the voltages monitors and the resulting signal will be transmitted to the unit 182 to deenergize the entire control system.

The static fail safe unit 182 is effective, upon the detection of predetermined failure signals, to disconnect the control system from the rear tractor wheel brake system and the trailer brake system. For example, by means of the circuits just described, failure of the ratio comparators 102 and 102' produces an input signal on line 180 which passes through OR-gates 204, 206 and 208 and time delay unit 210 to set the flip-flop 212 and energize the fail safe output relay 184.

The output of the voltage monitors 159, 160, 102 and 164 is continuously fed to the unit 182 to provide continuous monitoring of the operation of the hold and release solenoids. Since the "hold" signal is generated upon detection of relatively minor tendency of the rear wheels to lock and the release signal is generated upon the detection of a greater tendency of the rear wheels to lock, the hold signal must always be present when the release signal is generated if the system is operating properly. To check this, the hold and release signals are fed through lines 214, and 216, 218, and 220 and to AND-gates 222 and 224 which transmit a signal to the OR-gate system 204, 206 and 208 only if either release circuit is energized when either hold circuit is deenergized. The transmission of such a signal again actuates the relay 184.

As described above the front brakes are released, if, during brake application the speed of the front wheels is less than 5 miles per hour. To detect failure of this condition, a signal from the brake switch 140, the signal from the voltage monitor 226 associated with front solenoid 76 and from the zero speed detector 130 are fed to an AND-gate 228 which transmits a signal to the OR-gate 204 when the brakes are on the front solenoid is off and the speed of the front wheels is less than 5 miles per hour.

The signal from the front solenoid voltage monitor 226 and from the pressure switch 140 is also fed to an AND-gate 230 which transmits a signal to an OR-gate 232 and hence to the OR-gates 206 and 208 whenever the front solenoid is on and the brakes are off which again is a failure condition. A signal is also transmitted to the OR-gate 232 through line 234 if the brake switch 140 is not connected to the control system.

The output of the brake switch 140 and the output of the zero-speed detector 130 are also fed through an AND-gate 236 which transmits a signal to OR-gate 238 and hence to the OR-gate 208 whenever the brakes are off and the speed of the front wheels is less than 5 miles per hour, a condition which should not occur if the system is operating properly.

A failure condition also exists at any time when one or more of the hold solenoids are on, the brakes are not applied and the comparators are not being checked. To test this condition the output of the voltages monitors 159 and 162 is fed through an OR-gate 240 connected to the input of an AND-gate 242. The pressure switch 140 is also connected to the input of the AND-gate 242 as is the line 244 which inhibits gate 242 during the comparator check cycle. The output of the AND-gate 242 is connected to the OR-gate 238 to generate a failure signal whenever the brakes are off, one or more hold solenoids are on, and the comparators are not being checked.

Further protection against malfunction is provided by a circuit which momentarily actuates all of the solenoids each time the vehicle is started. For this purpose a starter input 246 transmits an actuating signal to each of the solenoid buffers each time the starter switch is moved to start position. The output of the starter switch is also fed through the OR-gate 158 to inhibit a comparator check when the ignition switch is in start position.

The reset signal generated by the front input unit 86 and associated networks 118 and 120, which is used to trigger oscillator 156 and thus start the comparator test cycle is also fed through a differentiating network 248 is blocked by the reset signal to the flip-flop gate 154 whenever the brakes are on. Accordingly, during brake application the brake control system will remain disconnected from the brake system if the failure condition in the control system has been indicated previously.

The brake pressure switch 140 is a critical part of the system. A resistor connected cross the terminals of the switch is provided to produce a signal by which the connection of the brakes to the remainder of the circuit may be positively checked. This signal is fed to the OR-gate 232 which produces a failure indication if the pressure switch is not correctly connected. The second output 250 from the brake pressure switch provides a positive indication of the brake on or brake off condition. This signal is fed to various system components as previously described.

We claim:

1. An antiskid vehicle brake control system for a vehicle having at least a pair of wheels each equipped with a pneumatically actuated brake, said system comprising a source of air under superatmospheric pressure, an operator controlled valve having an inlet connected to said source and an outlet, normally open solenoid-operated valve means having an inlet connected to the outlet of said operator controlled valve and an outlet, relay valve means having a first inlet in fluid pressure communication with the outlet of said solenoid-operated valve means and the second inlet connected to said pressure source, said relay valve means having an outlet, a conduit connected between said pneumatically actuated brake and said relay valve means outlet, means for sensing the angular velocity of at least one of said wheels and providing a signal the frequency of which is indicative of instantaneous wheel velocity, and control means connected to receive and process said signal from said wheel speed sensing means, said control means being connected to said solenoid-operated valve means and operative upon receipt of a signal from said sensing means indicative of a tendency of the wheels to lock to actuate said solenoid-operated valve and modify the fluid pressure communication between said operator controlled valve and said first inlet to said relay valve means.

2. The control system defined in claim 1, wherein said control means comprises means providing a wheel velocity indicative reference signal, means for comparing the first wheel velocity indicative signal with the wheel velocity reference signal and for producing an output signal when said first wheel velocity indicative signal is less than said velocity reference signal by a predetermined amount indicative of a tendency of said one wheel to lock, said output being effective to actuate said solenoid valve.

3. The system defined in claim 2, wherein said velocity reference signal providing means includes means for sensing the angular velocity of a vehicle wheel and providing a second signal the frequency of which is indicative of the instantaneous velocity of such wheel and wherein said comparing means comprises means for registering the number of cycles of the reference signal in a time interval of fixed duration, means for registering the number of cycles of the first velocity indicative signal in a time interval of like duration and wherein said output signal is produced when a comparison between the registering means indicates that the number of cycles of the first velocity indicative signal is less than the number of cycles of the reference signal by a predetermined number.

4. The system defined in claim 3 wherein the time intervals for which the comparison is made occur simultaneously.

5. The system defined in claim 3 wherein the first and second wheel indicative signals are produced from and are indicative of the velocities of different wheels.

* * * * *

PO-1050
(5/69)

UNITED STATES PATENT OFFICE
CERTIFICATE OF CORRECTION

Patent No. 3,620,577              Dated November 16, 1971

Inventor(s)    James C. Neisch and Alton B. Holmes

It is certified that error appears in the above-identified patent and that said Letters Patent are hereby corrected as shown below:

Column 2, line 14, change "hole" to read "hold"

Column 4, line 50, change "(330X10'7E'9 sec.) to read "(330 X 10-9 sec.)"

Column 5, line 2, after "AND" delete the letter "i"

Column 6, line 22, change "outer" to read "other"

Column 7, line 11, change "gate" to read "gates"

line 68, change "voltages" to read "voltage"

Column 8, line 44, change "voltages" to read "voltage"

line 71, change "cross" to read "across"

Signed and sealed this 11th day of July 1972.

(SEAL)
Attest:

EDWARD M.FLETCHER, JR.
Attesting Officer

ROBERT GOTTSCHALK
Commissioner of Patents